United States Patent [19]

Akazawa

[11] Patent Number: 4,993,044
[45] Date of Patent: Feb. 12, 1991

[54] SPREAD-SPECTRUM COMMUNICATION RECEIVER

[75] Inventor: Shigeo Akazawa, Tokyo, Japan

[73] Assignee: Clarion Co., Ltd., Tokyo, Japan

[21] Appl. No.: 400,823

[22] Filed: Aug. 30, 1989

[30] Foreign Application Priority Data

Sep. 2, 1988 [JP] Japan .................................. 63-221073

[51] Int. Cl.⁵ ............................................... H04K 1/02
[52] U.S. Cl. ......................................................... 375/1
[58] Field of Search ................................. 375/1; 380/34

[56] References Cited

U.S. PATENT DOCUMENTS

| | | | |
|---|---|---|---|
| 4,630,283 | 12/1986 | Schiff | 375/1 |
| 4,641,322 | 2/1987 | Hasegawa | 375/1 |
| 4,672,658 | 6/1987 | Kavehrad et al. | 375/1 |
| 4,707,839 | 11/1987 | Andrew et al. | 375/1 |
| 4,866,734 | 9/1989 | Akazawa et al. | 375/1 |
| 4,888,788 | 12/1989 | Teranishi et al. | 375/1 |
| 4,890,297 | 12/1989 | Zscheile, Jr. et al. | 375/1 |

Primary Examiner—Salvatore Cangialosi
Attorney, Agent, or Firm—Flynn, Thiel, Boutell & Tanis

[57] ABSTRACT

A spread-spectrum communication receiver uses two convolvers and a phase shifter to demodulate data from correlation outputs of the convolvers. The demodulated output is used to control the phase-shifting amount of the phase-shifter and gains of the correlation outputs.

4 Claims, 4 Drawing Sheets

SPREAD-SPECTRUM COMMUNICATION RECEIVER

FIELD OF THE INVENTION

This invention relates to a receiver used in spread-spectrum communication (hereinafter abbreviated SSC).

BACKGROUND OF THE INVENTION

Spread-spectrum communication is so arranged that the transmitter side transmits information by spreading the transmission spectrum (band expansion) using a PN code (maximal sequence code of code length 127, for example) with a much higher speed than the information and that a receiver side correlates the received signal with a PN code in its own receiver to demodulate data. This system has an advantage, among others, that deterioration of the received signal caused by frequency selective fading can be reduced.

Such a spread-spectrum communication receiver used in communication of this type is disclosed, for example, in Japanese Patent Publication No. 59-186440A. As shown in FIG. 5, this receiver essentially consists of matched filters 1 and 2, phase shifter 3 and phase detector 4, and is configured to apply a received spread-spectrum signal S to matched filters 1' and 2' to correlate it with a receiver's code and obtain output signals A and B. The output signal B is phase-shifted by 90° in phase shifter 3, and the phase shifted output signal B' and the output signal A are applied to the phase detector 4 to demodulate a data signal D.

In the conventional spread-spectrum communication receiver, however, the phase shifter, because of its position at the output side of the matched filter, must shift the phase of an output signal of a wideband, and it is therefore required to be a wideband phase shifter. Further, the wider the spread-out band, the wider is the required bandwidth of the phase shifter, and it is also required to uniformly shift the phase in this band. However, it is difficult to realize a phase shifter satisfying these requirements. Beside this, the phase shifter must be able to control the phase in order to correct a phase deviation practically caused by varieties in the characteristics of elements, varieties in the wiring length, temperature variations, etc. However, it is very difficult to realize such an arrangement over a wide band.

Assuming that the phase shifter is configured for phase controls as indicated above to automatically adjust a phase deviation, since the input signal to the correlator is a spread-spectrum signal, the output of the correlator is a correlated spike-waveform signal having a narrow time width, and a control circuit for processing the signal is complicated accordingly.

OBJECT OF THE INVENTION

It is therefore an object of the invention to provide an SSC receiver having a practically excellent arrangement which facilitates realization of a phase shifter, can control the phase thereof and can automatically adjust a phase deviation.

SUMMARY OF THE INVENTION

In order to achieve the object, an inventive SSC receiver comprises a first route including a convolver; a second route including a phase shifter and a convolver; a switch for switching the first and second routes; two amplifiers for respectively amplifying outputs of the two convolvers; a multiplier for multiplying outputs of the two amplifiers; a phase control circuit for controlling the phase shifter; an AGC control circuit for feeding signals responsive to an output of the multiplier back to the two amplifiers; and means provided in feedback routes to the two amplifiers to lock gains of the two amplifiers.

When a phase control is effected, the operation of the AGC is fixed to increase the accuracy and the speed of the phase control. Therefore, the inventive SSC receiver, which is configured to not only select a CW signal but also fix the operation of the AGC circuit, can control the phase under no influence of the AGC circuit.

DETAILED DESCRIPTION

Figure 1:
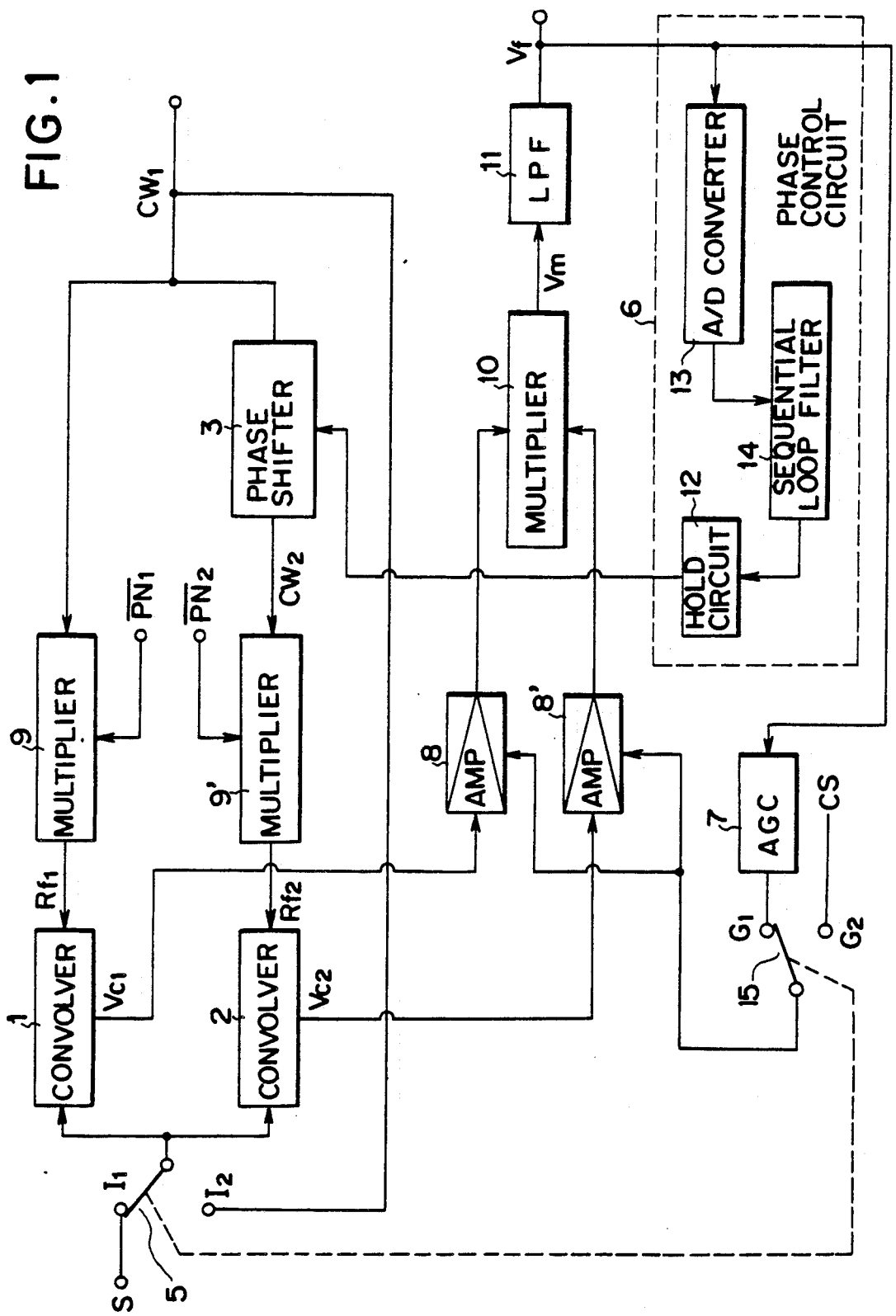
FIG. 1 is a block diagram of an SSC receiver system embodying the invention.

The invention is described below in detail, referring to preferred embodiments illustrated in the drawings. The illustration is not but an example, and the invention may involve modifications and improvements without departing the scope thereof.

Figure 3A:
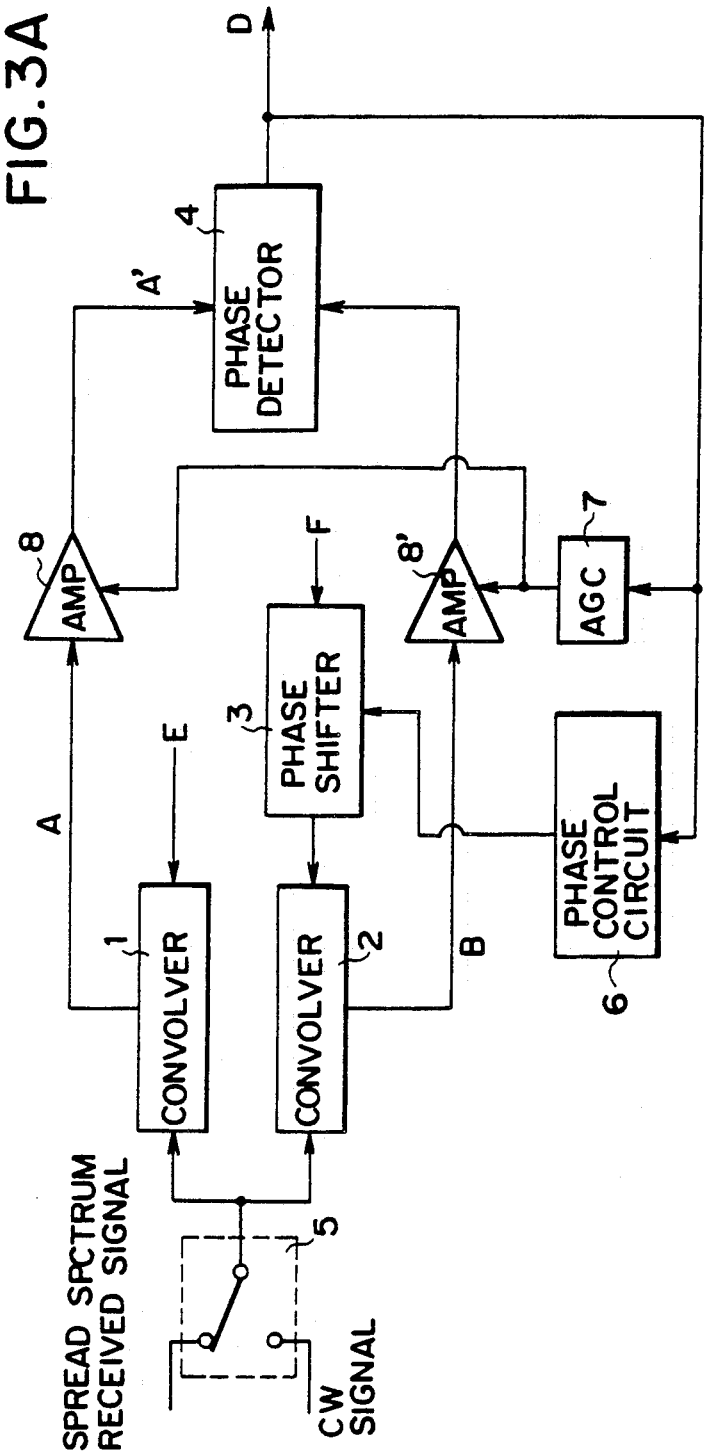
FIGS. 3A and 3B are a block diagrams of a general SSC receiver system.
Figure 3B:
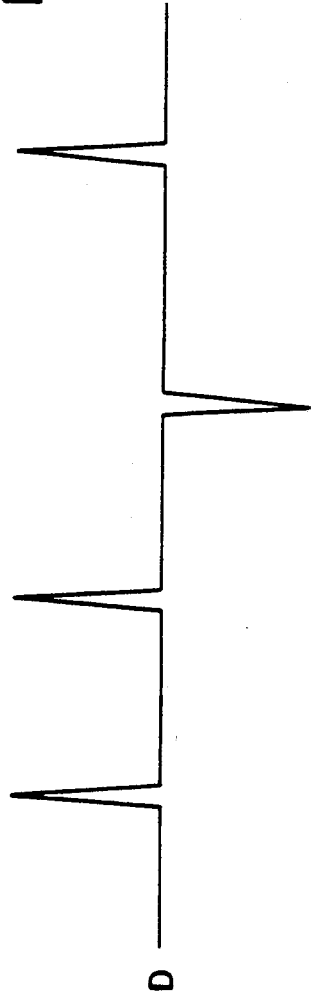

FIG. 3($a$) shows a receiver for SSC generally consisting of correlation means such as convolvers 1 and 2, phase shifter 3, phase detector 4, switch 5, phase control circuit 6 and AGC circuit 7, and configured to apply a received spread-spectrum signal S to one of inputs of each of the convolvers 1 and 2 and apply reference signals E and F to the other inputs of both convolvers to correlate the signals and obtain output signals A and B. These signals are applied to the phase detector 4 to obtain a data signal D. As shown in FIG. 3($b$), the data signal D has a spike-shaped waveform. Therefore, upon effecting a phase control in the phase shifter 3 and the phase control circuit 6, the entered signal is first changed from the received signal to the CW signal by the switching element 5 and then the phase control is performed.

In this phase control, the phase control circuit 6 behaves to minimize the output of the phase detector 4, but the AGC circuit 7 oppositely behaves to maintain the output of the phase detector 4 at a constant value. Therefore, much time is required for the phase control, and a proper phase control is not expected.

FIG. 1 is a block diagram showing an essential arrangement of an inventive SSC receiver taken as an embodiment. In FIG. 1, the same or equivalent elements as those in FIG. 3 are labeled with the same reference numerals. Numerals 9 and 9' refer to multipliers, 10 to a multiplier behaving as demodulating means, 11 to a low-pass filter, 12 to a holding circuit, 13 to an A/D converter, 14 to a sequential loop filter, and 15 to a switch.

The phase control operation of the aforegoing embodiment is explained below.

When the switch 5 is in contact with a contact $I_1$, the received spread-spectrum signal S is applied to one of inputs of the convolver 1 and one of inputs of the convolver 2, and first and second reference signals $R_{f1}$ and $R_{f2}$ are applied to the other inputs of both convolvers 1 and 2.

A CW signal $CW_1$ having the same frequency as that of an RF carrier signal of the spread-spectrum signal S is applied to one of inputs of the phase shifter 3 and one of inputs of the multiplier 9. The phase shifter 3 shift the phase of the CW signal $SW_1$ by 90° and applies it to one of inputs of the multiplier 9'.

To the other inputs of the multipliers 9 and 9' are applied PN codes $\overline{PN_1}$ and $\overline{PN_2}$ necessary for demodulation, and outputs of the multipliers 9 and 9' are used as the first and second reference signals $R_{f1}$ and $R_{f2}$.

The convolvers 1 and 2 correlate the spread spectrum signal S with the first and second reference signals $R_{f1}$ and $Rf2$, respectively, and respective correlation outputs $V_{c1}$ and $V_{c2}$ and are applied to the multiplier 10 via the amplifiers 8 and 8'. An output of the multiplier 10 is applied to the low-pass filter 11 to obtain a data demodulation signal Vf.

The received spread-spectrum signal S is expressed by:

$$S = Vd(t) = P_1(t)\sin(\omega_0 t) + A \cdot P_2(t)\cos(\omega_0 t) \qquad (1)$$

where $P_1(t)$ and $P_2(t)$ indicate first and second PN codes used for modulation in the transmitter side, A indicates data which is 1 or −1, and the signal S is equally applied to the two convolvers 1 and 2.

When the phase shifting amount of the phase shifter is $\theta$, the first and second reference signals $R_{f1}$ and $R_{f2}$ applied to the convolvers 1 and 2 are expressed by:

$$R_{f1} = V_{r1}(t) = \overline{P_1(t)}\cos(\omega_0 t) \qquad (2)$$

$$R_{f2} = V_{r2}(t) = \overline{P_2(t)}\cos(\omega_0 t + \theta) \qquad (3)$$

where $\overline{P_1(t)}$ and $\overline{P_2(t)}$ indicate PN codes $\overline{PN_1}$ and $\overline{PN_2}$ used for demodulation in the receiver side and they are mirror images (time-inverted signals) of $P_1(t)$ and $P_2(t)$ in the transmitter side.

Outputs $V_{c1}(t)$ and $V_{c2}(t)$ of the two convolvers are expressed by:

$$V_{c1}(t) = CONV\{Vd(t), V_{r1}(t)\} \qquad (4)$$

$$V_{c2}(t) = CONV\{Vd(t), V_{r2}(t)\} \qquad (5)$$

where CONV $\{V_1(t), V_2(t)\}$ indicates the convolution of two inputs $V_1(t)$ and $V_2(t)$. When they are expressed by:

$$V_1(t) = \cos(\omega_0 t) \qquad (6)$$

$$V_2(t) = \cos(\omega_0 t + \theta) \qquad (7)$$

the convolver output CONV $\{V_1(t), V_2(t)\}$ is expressed by:

$$CONV\{V_1(t), V_2(t)\} = \eta \cdot \cos(2\omega_0 t + \theta + \phi) \qquad (8)$$

where $\eta$ is the efficiency of the convolver, and $\phi$ is an additional phase inherent to the convolver. It is noted that the phase variation $\theta$ of one input $V_2(t)$ in the original form appears at the output.

Since correlation between $P_1(t)$ and $\overline{P_2(t)}$ and correlation between $P_2(t)$ and $\overline{P_1(t)}$ are small, large errors are not produced under:

$$V_{c1}(t) \approx CONV\{P_1(t)\sin(\omega_0 t), \overline{P_1(t)}\cos(\omega_0 t)\} \qquad (9)$$

$$V_{c1}(t) \approx CONV\{A \cdot P_2(t)\cos(\omega_0 t), \overline{P_2(t)}\cos(\omega_0 t + \theta)\} \qquad (10)$$

Equations (9) and (10) may be expressed by the following progressive forms:

$$V_{c1}(t) = \eta_1 \cdot R_1(t)\sin(2\omega_0 t = \phi) \qquad (11)$$

$$V_{c2}(t) = \eta_2 \cdot A \cdot R_2(t)\cos(2\omega_0 t + \theta + \phi_2) \qquad (12)$$

where $R_1(t)$ and $R_2(t)$ are convolutions between $P_1(t)$ and $\overline{P_1(t)}$ and between $P_2(t)$ and $\overline{P_2(t)}$, and $\phi_1$ and $\phi_2$ are additional phases inherent to respective convolvers.

An output Vm(t) after multiplication of $V_{c1}(t)$ $V_{c2}(t)$ is expressed by:

$$\begin{aligned} Vm(t) &= V_{c1}(t) \cdot V_{c2}(t) \\ &= \eta_1 \cdot \eta_2 \cdot A \cdot R_1(t) \cdot R_2(t) \cdot \\ &\quad \cos(2\omega_0 t + \phi_1) \cdot \\ &\quad \cos(2\omega_0 t + \theta + \phi_2) \end{aligned} \qquad (13)$$

When equation (13) involves the following relationship:

$$\theta + \phi_2 = \phi_1 - \pi/2 \qquad (14)$$

Vm(t) may be expressed by:

$$\begin{aligned} Vm(t) &= \eta_1 \cdot \eta_2 \cdot A \cdot R_1(t) \cdot R_2(t) \cdot \\ &\quad \sin(2\omega_0 t + \phi_1) \cdot \\ &\quad \cos(2\omega_0 t + \phi_1 - \pi/2) \\ &= \eta_1 \cdot \eta_2 \cdot A \cdot R_1(t) \cdot R_2(t) \cdot \\ &\quad \sin^2(2\omega_0 t + \phi_1) \end{aligned} \qquad (15)$$

Further, a demodulation signal Vf(t) obtained by passing Vm(t) through the low-pass filter is expressed by:

$$V_f(t) = \eta_1 \cdot \eta_2 \cdot A \cdot R_1(t) \cdot R_2(t) \qquad (17)$$

Figure 2:
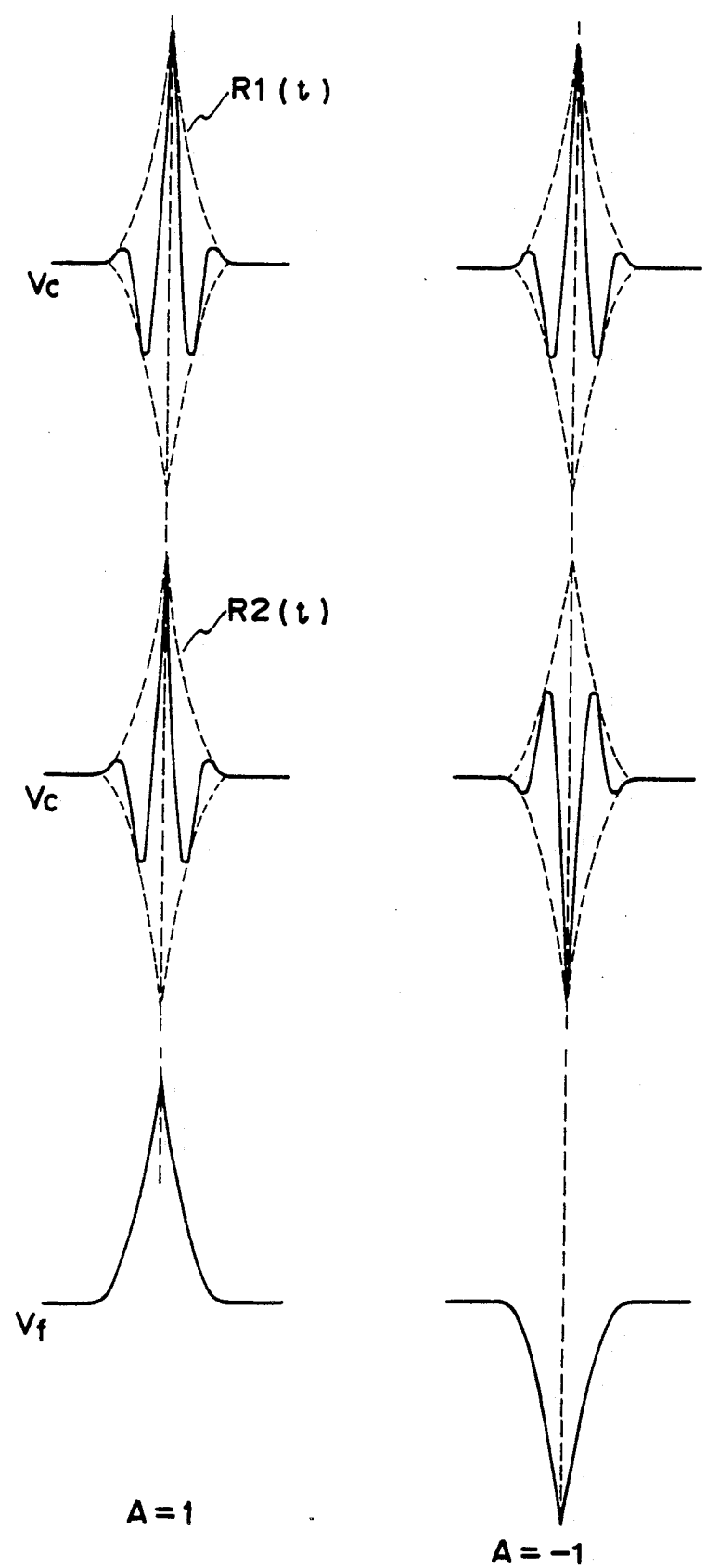
FIG. 2 shows the waveforms of convolution outputs.

FIG. 2 shows examples of $V_{c1}(t)$, $V_{c2}(t)$ and Vf(t) under $\phi_1 = \phi_2$. It is noted from FIG. 2 and equation (17) that data demodulation is possible.

When $\theta + \phi_2 = \phi_1$ is established in equation (14), Vf(t) is zero (Vf(t)=0) and demodulation is impossible. As mentioned before, $\phi_1$ and $\phi_2$ do not always coincide due to a difference between characteristics of two convolvers, small differences in the temperature characteristic and wiring lengths, etc.

Therefore, in this case, it is noted from equation (14) that the predetermined phase shifting amount $\theta$ may be:

$$\theta = \phi_1 - \pi/2 - \phi_2 \qquad (16)$$

It is further noted that multipliers 9, 9' and 10 may be nonlinear circuits using a transistor or a diode.

In this connection, for purposes of correcting its phase deviation, the invention is configured to change connection of the switching element to the contact $I_2$ to apply the CW signal $CW_1$ to one of the inputs of each of the convolvers 1 and 2 and is configured to change the first and second PN codes to d.c. bias voltages.

When the input signal is indicated by $Vd(t)$, it is expressed by:

$$Vd(t) = \cos(\omega_0 t) \qquad (18)$$

Further, since the first and second PN codes are changed to d.c. bias voltages, the following relationship is established:

$$\overline{P_1(t)} = \overline{P_2(t)} = 1 \qquad (19)$$

Therefore, convolution outputs $V'_{c1}(t)$ and $V'_{c2}(t)$ are expressed by:

$$V'_{c1}(t) = \eta_1 \cdot \cos(2\omega_0 t + \phi_1) \qquad (20)$$

$$V'_{c2}(t) = \eta_1 \cdot \cos(2\omega_0 t + \phi_2) \qquad (21)$$

An output $V'm(t)$ after multiplication of $V'_{c1}(t)$ and $V'_{c2}(t)$ is expressed by:

$$V'm(t) = \eta_1 \cdot \eta_2 \cdot \cos(2\omega_0 t + \phi_1) \cdot \cos(2\omega_0 t + \phi_2) \qquad (22)$$

If the following relationship is established:

$$\theta + \phi_2 = \phi_1 - \pi/2 \qquad (23)$$

the output $V'm(t)$ is as follows:

$$V'm(t) = \eta_1 \cdot \eta_2 \cdot \cos(2\omega_0 t + \phi_1) \cdot \sin(2\omega_0 t + \phi_1) \qquad (24)$$

and an output $V'f(t)$ of the low-pass filter 11 is as follows:

$$V'f(t) \propto \eta_1 \cdot \eta_2 \cdot \cos(\phi_1 - \theta - \phi_2) \qquad (25)$$

When the above-indicated output is a positive value, the phase shifter 3 is controlled to have a delay phase, while, with a negative value of the output, the phase shifter 3 is controlled to have an advance phase, so that it is finally balanced at:

$$V'f(t) = 0 \qquad (26)$$

The balancing requirement in this case is:

$$\phi_1 - \theta - \phi_2 = \pi/2 \qquad (27)$$

Therefore, the following relationship is established:

$$\theta = \phi_1 - \phi_2 - \pi/2 \qquad (28)$$

The condition of equation (28) coincides with the optimum condition of data demodulation.

Thus the phase control circuit controls so that the output $V'f(t)$ of the low-pass filter becomes zero (0). However, the AGC circuit 6 effects the opposite control so as to maintain $V'f(t)$ at the set voltage. Therefore, it often occurs that the phase control is not properly effected or takes time. In order to prevent it, not only is the switching element switched to the contact $I_2$, but the switching element 15 is switched to $G_2$ as well, so as to fix gains of the amplifiers 8 and 8' using the set signal CS. In this fashion, the operation of the AGC circuit can be locked, and the object is attained.

Figure 4:
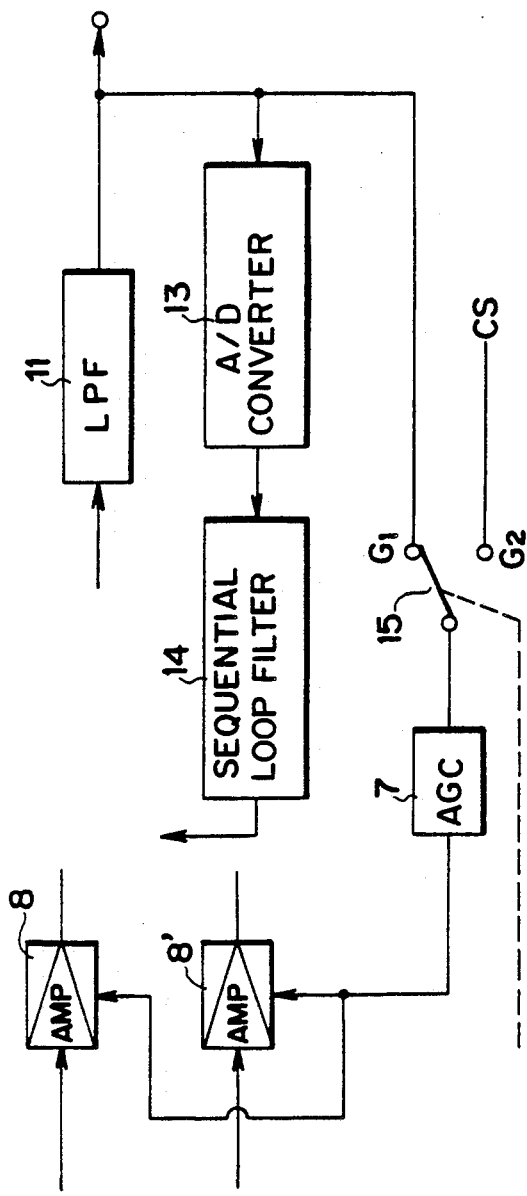
FIG. 4 is a block diagram of an inventive SSC receiver system taken as a further embodiment.
Figure 5:
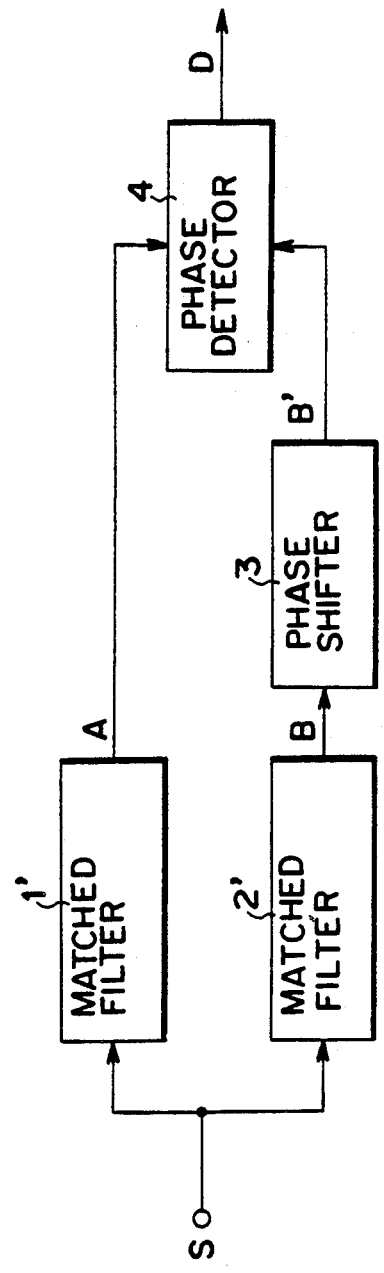
FIG. 5 is a block diagram showing an essential arrangement of SSC receiver.

The same effect is obtained by using an arrangement shown in FIG. 4 in lieu of the arrangement of FIG. 1. The arrangement of FIG. 4 uses the switch 15 to selectively apply the output of the low-pass filter or a predetermined CS signal to the AGC circuit 7.

As explained above, the inventive device does not take time for phase controls and ensures proper phase controls.

What is claimed is:

1. A spread-spectrum communication receiver comprising:
    a first route including first correlating means;
    a second route including a phase shifter and second correlating means;
    a first switch for selectively applying an input signal or a CW signal to said first and second correlating means;
    demodulating means for demodulating data, based on outputs of said first and second correlating means;
    a phase control circuit for controlling the phase-shifting amount of said phase shifter;
    an AGC circuit responsive to said demodulating means to control gains of said outputs of both said correlating means; and
    means for locking said gains.

2. The spread-spectrum communication receiver according to claim 1 wherein said lock means is a second switch for selectively applying an output of said AGC circuit or a predetermined signal to both said amplifiers.

3. The spread-spectrum communication receiver according to claim 1 wherein said lock means is a third switch for selectively applying an output of said demodulating means via a low-pass filter or a predetermined signal to said AGC circuit.

4. The spread-spectrum communication receiver according to claim 1 wherein said lock means is linked to said first switch.

* * * * *